Patented Oct. 19, 1954

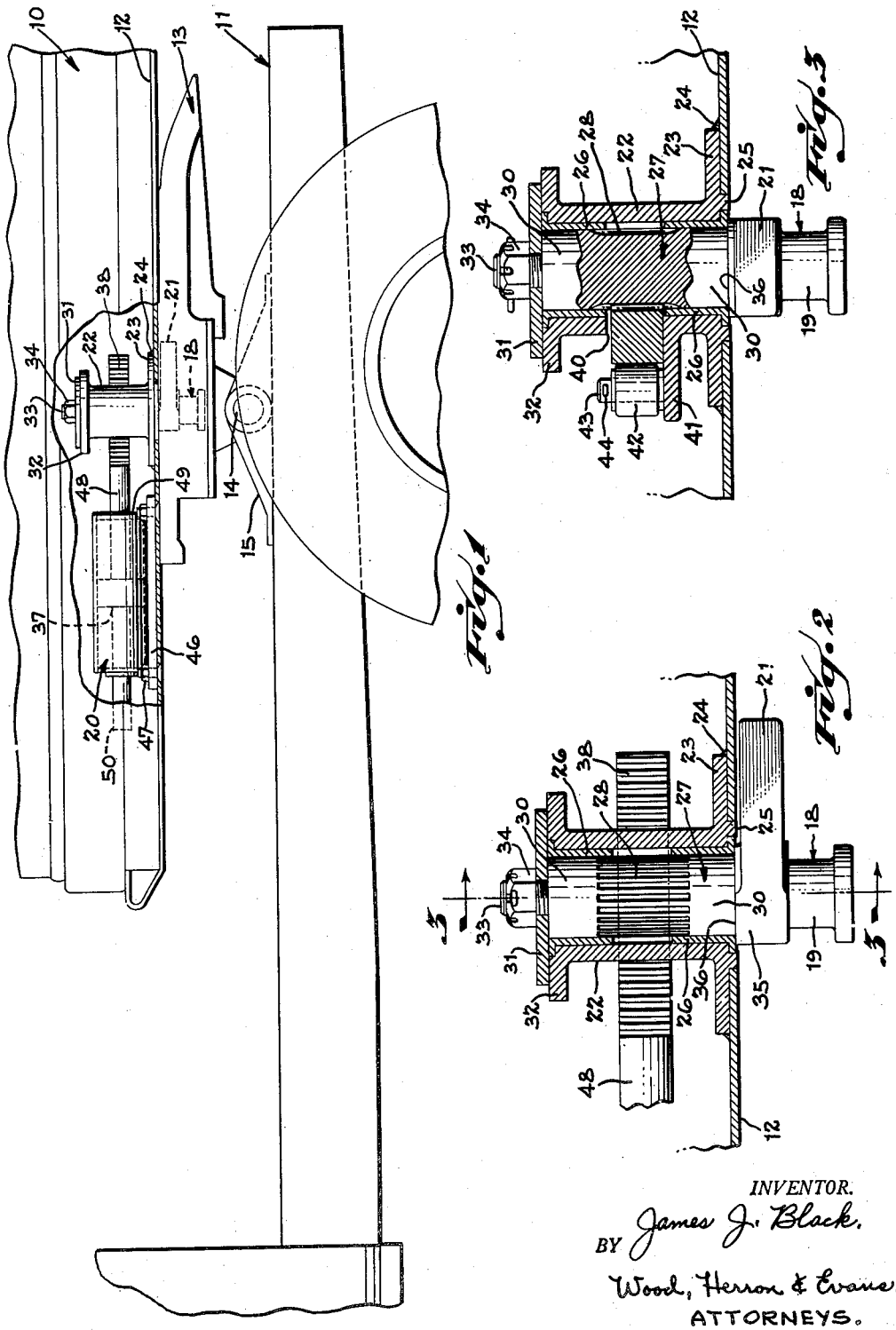

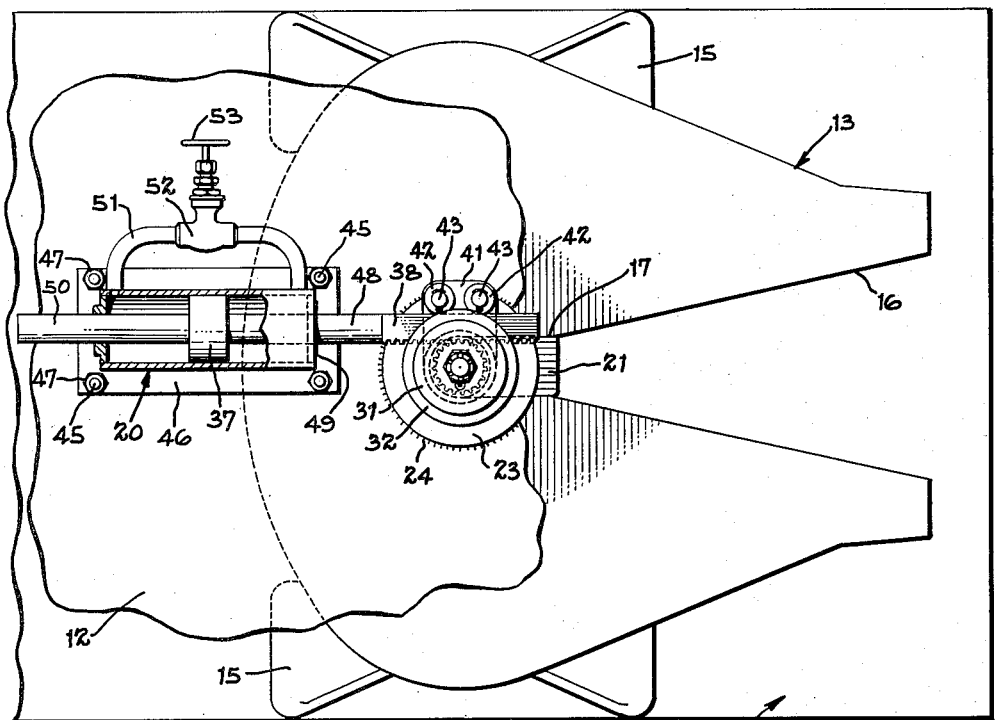
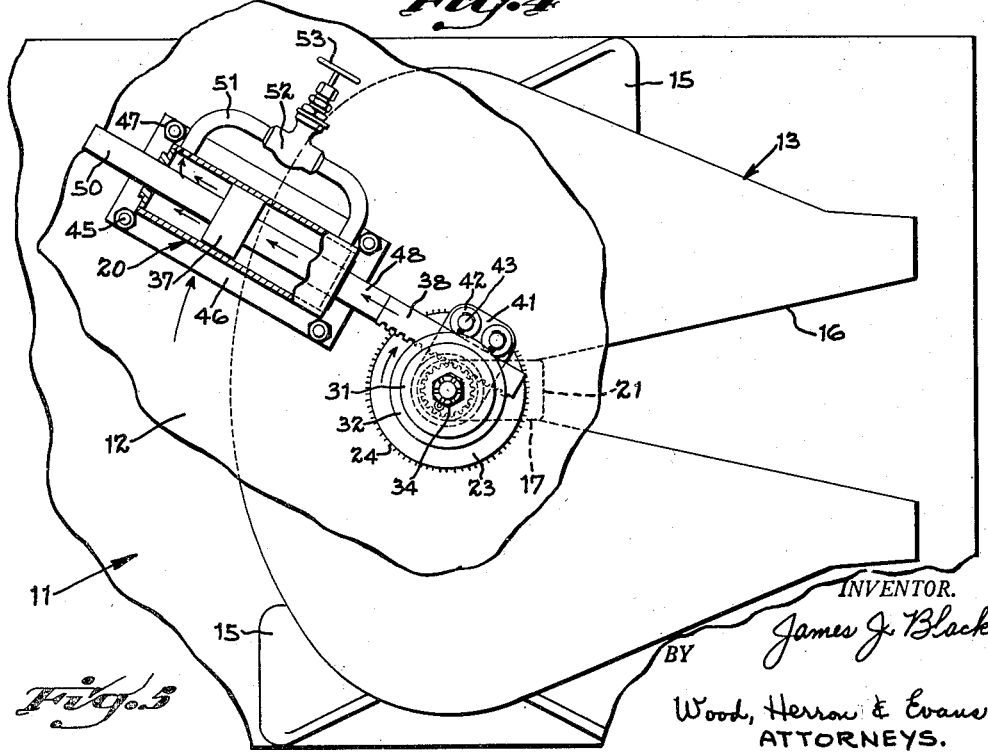

2,692,146

UNITED STATES PATENT OFFICE 2,692,146

STABILIZED COUPLING MECHANISM FOR TRACTOR-TRAILER VEHICLES

James J. Black, Cincinnati, Ohio, assignor, by mesne assignments, to Trailmobile, Inc., a corporation of Delaware Application February 14, 1951, Serial No. 210,943

6 Claims. (Cl. 280—432)

This invention relates to semi-trailers and embraces particularly a fifth wheel coupling structure equipped with a damping apparatus designed to suppress "jack-knifing" of the trailer in order to promote safety. By jack-knifing is meant the dangerous and uncontrolled skidding of the trailer angularly toward the tractor, the trailer sometimes swinging to such an extent that its forward or coupled end crashes into the side of the tractor cab, causing a serious traffic accident.

A semi-trailer transport unit for which the invention is particularly intended, consists of a trailer having one or more sets of road wheels at its rearward end and having a fifth wheel at its forward end resting upon and supported slidably by the tractor fifth wheel. A king pin passing through the fifth wheels at their common center of rotation, provides an articulated draft connection between the trailer and tractor, the fifth wheels being arranged to swivel with respect to one another as the trailer follows the tractor. Under normal driving conditions the trailer tracks in a straight line behind the tractor and in making turns the tractor swings angularly and the trailer follows the new line of travel by reason of the pivotal connection of the king pin.

This arrangement permits unrestricted articulation between the tractor and trailer and is satisfactory under normal driving conditions. While the tractor is pulling the trailer either on the level or up hill, the two vehicles will naturally remain in line with one another; however, when descending a grade or while decelerating, there is a tendency, due to momentum, for the trailer to overrun the tractor, and this may give rise to jack-knifing especially if the roadway is slippery because of weather conditions. Apparently this is most likely to occur either while the vehicle is being slowed gradually under engine compression without application of the brakes or because of braking if the tractor braking effect is stronger than the trailer braking effect. In other words, the paticular combination of circumstances which may set the stage for such accidents are unpredictable and can cause serious accidents without fault of the driver. Once the trailer begins to jack-knife, there is little the driver can do to regain control except to gun the tractor and thereby to pull the trailer back into alignment, but often this is impossible because the vehicle must be slowed down to avoid trouble. However, it will be apparent that if free angulation between the tractor and trailer is resisted or damped, the tendency of the trailer to skid or jack-knife will correspondingly be suppressed and the vehicle will have greater stability.

It is one of the primary objects of the invention to provide a hydraulic damping apparatus of simple construction and reliable operation which may be added to the standard fifth wheel assemblies now in extensive use and which will not resist or interfere with normal steering of the transport vehicle, but which will apply automatically a resistance to sudden angular trailer movements so as to suppress jack-knifing, side sway or skidding.

As noted above, the standard fifth wheel equipment allows unrestrained angular movement between the tractor-trailer unit by reason of the swivel effect of the fifth wheels. In order to permit the tractor to be uncoupled from the trailer, one of the fifth wheels includes one or more coupling jaws which engage the king pin to provide the draft connection and which may be disengaged to release the pin. The standard equipment is furnished with the king pin mounted either upon the tractor or trailer fifth wheel, the coupling jaws being mounted upon the opposite fifth wheel to engage the pin. A slot is formed in the mating fifth wheel to guide the king pin to the coupling jaws as the tractor is backed into position with respect to the trailer to establish the coupled engagement. Normally the king pin is mounted non-rotatably with respect to its fifth wheel and rotates relative to the coupling jaws of the opposite fifth wheel to permit articulation of the transport unit. In the present disclosure the king pin is mounted upon the trailer fifth wheel, but it will be obvious that the relationship of parts can be reversed to accommodate equipment which carries the king pin on the tractor fifth wheel.

Briefly, it is the concept of this invention to provide a controlled resistance against rapid articulation of the tractor and trailer by the use of the hydraulic damping cylinder assembly connected to the king pin and responsive to turning movements of the king pin such that the relatively slow turning movements which occur in steering the vehicle are unrestricted while rapid turning movements which occur in jack-knifing, rapid side sway or skidding are restricted automatically by the hydraulic cylinder. By applying resistance in this manner, the trailer is held in line even though the tractor is decelerating under dangerous conditions so as to suppress such movements at their inception.

Generally described with reference to the disclosure, the apparatus constitutes a king pin rotatably mounted upon the trailer fifth wheel, having teeth formed in its upper shank engaged by a rack bar having its end connected to the piston of a hydraulic cylinder assembly, such that rotary movements of the king pin are converted into linear movements and resisted by the hydraulic cylinder assembly. The lower end of the king pin, which engages the slot of the tractor fifth wheel, includes a lug which establishes a non-rotatable connection with the fifth wheel slot when the vehicles are coupled; therefore movements are under control of the cylinder assembly.

In order to allow controlled turning movements which occur normally in steering the vehicle, the hydraulic cylinder includes a by-pass line connected across its opposite ends with a metering valve interposed in the line to restrict the displacement of hydraulic liquid under movements in either direction of the piston. By adjustment of the metering valve, the flow resistance under normal steering movements is insufficient to cause any substantial steering resistance, but is sufficiently great to prevent rapid displacement of liquid during jack-knifing or skidding. In other words, the cylinder assembly produces a dashpot action to suppress jack-knifing, the rate of angulation being held sufficiently low to allow the driver to straighten up the vehicle and thus to correct the condition before the vehicle becomes uncontrollable. The rack and pinion connection between the king pin and hydraulic cylinder assembly allows complete angulation between the tractor and trailer so that the transport vehicle can be maneuveured without regard to limits imposed by the damping apparatus.

Further objects of the invention have been to provide a damping structure which permits the convenient replacement and servicing of the king pin and its cooperating parts; to provide a hydraulic arrangement having a by-pass control valve which may be adjusted to increase or decrease the damping effect in accordance with road conditions; and to produce a rigid bearing for the king pin for mounting it rotatably while providing a reliable draft connection. These and other features and advantages of the invention will be more fully disclosed in the following specification taken in conjunction with the drawings in which:

Figure 1 is a fragmentary side view of a tractor-trailer unit showing generally the fifth wheel coupling arrangement and hydraulic stabilizing apparatus associated with the fifth wheel king pin.

Figure 2 is an enlarged fragmentary sectional view taken from Figure 1, illustrating in detail the king pin and the rack and pinion connection for damping the rotary movements of the king pin.

Figure 3 is a sectional view taken on line 3—3, Figure 2 further detailing the king pin construction.

Figure 4 is a fragmentary top plan view illustrating the rearward end of the tractor and its fifth wheel and showing a portion of the trailer fifth wheel and damping apparatus in coupled position with respect to the tractor fifth wheel. In this view the parts are shown in the position assumed when the two vehicles are traveling in a straight line.

Figure 5 is a fragmentary view similar to Figure 4, showing the trailer swinging to an angular position and illustrating the operation of the damping apparatus during such angular movement.

As shown in Figure 1, the damping apparatus is applied to a tractor-trailer coupling mechanism in which the king pin is carried by the trailer fifth wheel and is engaged by means of coupling jaws (not shown) mounted upon the tractor fifth wheel. With the exception of the damping apparatus, the coupling mechanism illustrated represents a widely used commercial structure. As above noted, it is contemplated to apply the damping apparatus without substantial change to equipment in which the king pin is mounted upon the tractor fifth wheel and the coupling jaws carried by the trailer fifth wheel.

Described generally with reference to Figure 1, the trailer is indicated generally at 10 and the tractor is indicated at 11, the trailer chassis having a fifth wheel plate 12 mounted at its forward end resting upon the tractor fifth wheel 13. The rearward end of the trailer is supported by road wheels (not shown) while its forward end is thus supported by the fifth wheel mechanism. When the trailer is to be uncoupled from the tractor, the coupling jaws are released and the tractor is driven forwardly causing the tractor fifth wheel to slide from beneath the trailer fifth wheel. The forward end of the trailer then drops downwardly and is supported by means of a landing gear or prop at an elevation to permit the tractor to be recoupled.

In order to provide an inclined skid surface for elevating the trailer to coupling position, the tractor fifth wheel 13 in the present instance is of the rocking type, for which purpose it is pivotally mounted as at 14 upon a bracket 15 carried by the tractor. This mounting allows the fifth wheel 13 to drop to a rearwardly inclined position when the vehicles are uncoupled. As the fifth wheel slides beneath the trailer during coupling, it rocks back to its horizontal plane by engagement against the trailer fifth wheel.

As best shown in Figures 4 and 5, the rearward end of the tractor fifth wheel is provided with a pie-shaped guideway 16 which converges forwardly to a slot 17 which is located approximately at the center of the fifth wheel. The guideway 16 is arranged to receive and guide the king pin 18 to its final coupling position within slot 17 for engagement by the coupling jaws. The coupling jaws are mounted within the tractor fifth wheel in a position to engage the necked portion 19 of the king pin.

Normally the king pin is non-rotatably mounted with respect to the trailer fifth wheel such that turning movements between the tractor and trailer cause the king pin to rotate with respect to the coupling jaws on the tractor. However, in the present structure, the king pin is rotatably mounted upon the trailer and is keyed to the tractor fifth wheel so that the king pin will rotate upon turning movements of the tractor. Such rotary movements are damped by the hydraulic apparatus 20 mounted upon the trailer fifth wheel plate 12 and connected to the king pin. Under normal practice the fifth wheel coupling provides unrestricted swiveling or turning movements between the upper and lower fifth wheels. The present structure permits such movements but by operation of the damping apparatus, applies a predetermined variable turning resistance. This allows the tractor to execute its normal steering movements with practically no damping resistance while the hydraulic apparatus produces a high resistance against rapid turning movements which occur when the vehicle jack-knifes or skids.

Generally described, the hydraulic damping apparatus is located upon the upper surface of the trailer fifth wheel plate beneath the floor of the trailer in a position which does not require any change in the trailer structure. Since both the king pin and cylinder assembly are mounted upon the plate, the forces developed in its operation are absorbed by the plate itself.

The piston of the cylinder assembly occupies an intermediate position within the cylinder when the tractor and trailer are approximately in line and is moved toward either end of the cylinder in response to angulation of the tractor-trailer. The hydraulic fluid so displaced is metered by the control valve so as to damp rapid angulations by a dash pot action but to allow substantially unrestrained steering angulations. The fifth wheel organization is coupled and uncoupled in the usual manner and the lower end of the king pin keys itself automatically to the tractor fifth wheel when the vehicles are coupled.

In order to key the king pin with respect to the tractor fifth wheel, a locking lug 21 is formed upon the lower portion of the king pin which projects downwardly below the trailer fifth wheel plate. This lug occupies a trailing position with respect to the guideway 16 during coupling movement and is dimensioned to fit snugly within the slot 17 when the king pin is in final coupled position as shown in Figure 4. As shown in Figure 1, the locking lug is located immediately below the fifth wheel plate 12 and above the necked portion 19 to avoid interference with the coupling jaws. Since the king pin is keyed to the tractor fifth wheel, steering movements of the tractor will cause the king pin to rotate with respect to the trailer and these movements are converted to linear movements and regulated by the hydraulic cylinder assembly 20.

The king pin is rotatably mounted within a bearing collar 22 having a base flange 23, which is preferably welded as at 24 to the trailer fifth wheel plate 12 (Figures 2 and 3). The base flange includes a concentric boss 25 which nests within a hole formed in the plate 12 and which serves to center the collar accurately with respect to the plate at assembly. The collar is provided with liners 26—26 in its upper and lower ends for journalling the shank 27 of the king pin and the intermediate portion of the shank includes teeth 28 which are machined into it.

The upper and lower portions of the king pin indicated at 30—30 constitute journals in bearing engagement with the liners 26—26 and the pin is confined against longitudinal displacement with respect to the sleeve by means of a disk 31 at its upper end which bears rotatably upon the flange 32 formed at the upper end of sleeve 22. Disk 31 is mounted upon a threaded stud 33 and clamped in position by a castellated nut 34 threaded upon the upper end of the stud.

The lower end of the king pin includes a hub portion 35 which forms a shoulder 36 engaged against the lower end of the sleeve such that the king pin is confined longitudinally by engagement of the hub and disk at opposite ends of the sleeve. As shown in Figure 2, the king pin, including the hub and locking lug, preferably is formed in one piece such as by a casting or forging operation. The mounting arrangement is such that the king pin can be removed readily for replacement of the liners upon disengaging the rack by removal of its guide rollers, taking off the nut 34, and then drawing the pin from its collar downwardly. With the king pin removed, the bearing liners can be withdrawn from the opposite ends of the collar and replaced with new ones if they become worn excessively.

As best shown in Figures 3 and 4, the hydraulic cylinder includes a piston 37 to which is secured a rack bar 38 having teeth engaging the teeth of the king pin, the bearing sleeve 22 being provided with an opening 40 at one side for admitting the rack bar. The rack bar 38 is supported with reference to the king pin teeth by means of a flat flange 41 which forms a part of the sleeve 22 providing a smooth bearing surface for supporting the rack. Flange 41 further includes a pair of guide rollers 42—42 pivotally mounted upon stub shafts 43—43 fixed to and extending upwardly from the flange 41. These rollers bear against the flat side of the rack bar to control the engagement of the rack teeth with the king pin teeth. The rollers are held in position upon the stub shafts by means of cotter pins 44 which pass through the upper ends of the stub shafts.

The hydraulic cylinder assembly 20 is mounted upon the fifth wheel plate 12 by means of screws 45 passing through the mounting flange 46 of the cylinder. As shown in Fig. 1, the heads of the screws lie flush with the under surface of the fifth wheel plate so as to avoid interference with the tractor fifth wheel. Nuts 47 are threaded upon the upper ends of the screws to clamp the cylinder assembly firmly upon the fifth wheel plate.

As shown in Figure 4, the piston 37 is connected by a piston rod 48 passing through cylinder head 49, the piston rod being sealed with respect to the head 49. The piston rod is cylindrical and the rod and rack bar preferably are formed in one piece, the cylindrical portion being turned down from the square stock which constitutes the rack bar. In order to compensate for the displacement of hydraulic fluid as the piston rod moves into and out of the cylinder, the piston rod is extended as at 50 through the opposite head of the cylinder. The extended portion 50 of the rod is of the same diameter as the rod 48 and is sealed in the same manner with respect to the cylinder head through which it passes.

As shown in Figure 4, the piston 37 occupies an intermediate position longitudinally of the cylinder when the tractor and trailer are in alignment. When the vehicles move out of alignment, the displaced fluid is bypassed through the line 51 extending across the cylinder and connected to the forward and rearward ends of the cylinder. A control valve 52 of conventional design is interposed in the bypass line to meter the passage of fluid. This valve is adjustable by means of the handle 53 so as to control the flow resistance and thereby to determine the turning resistance developed by the apparatus. As shown in Figure 5, jack-knifing of the trailer in the direction indicated by the arrow will cause the piston to be forced towards the rearward end of the cylinder, causing the hydraulic fluid to be displaced from the rearward end and bypassed to the forward end of the cylinder. Jack-knifing in the opposite direction will cause movement of the piston from its intermediate position toward the opposite end of the cylinder under the metering influence of the valve. It is characteristic of the hydraulic flow under control of the metering valve, to permit normal steering movements without undue resistance due to the relatively slow displacement of fluid. However, rapid turning movements, by virtue of the increasing flow resistance, are damped to a sufficiently low rate to restrict jack-knifing and to stabilize the vehicle.

The effective length of the rack bar and piston travel are so related to the toothed diameter of the king pin that the pin can be rotated through an arc corresponding to the full limits of angulation normally allowed between the tractor and trailer. The damping apparatus therefore does not interfere with normal maneuvering which sometimes requires that the tractor be sharply angulated to the trailer.

As applied to the standard coupling mechanism having the king pin mounted on the tractor fifth wheel, the relative position of the damping apparatus is reversed, but its structure is substantially unchanged. In this case the damping cylinder assembly is mounted on the underside of the tractor fifth wheel and connected to the king pin in the manner disclosed, with the king pin extending upwardly to key with the slot of the trailer fifth wheel. In either installation the coupling and uncoupling procedure is unchanged and the apparatus requires no change in driving technique since the apparatus functions automatically.

Having described my invention, I claim:

1. In a coupling mechanism for a tractor-trailer unit including upper and lower fifth wheels, a damping apparatus for suppressing jack-knifing of the tractor-trailer unit comprising; a king pin passing through the fifth wheels for establishing a draft connection therebetween, a bearing collar mounted upon the upper fifth wheel rotatably mounting the king pin, a hydraulic damping device including a reciprocating piston, the hydraulic damping device being mounted upon the upper fifth wheel, pinion teeth formed on the king pin, a rack bar having teeth meshed with the said pinion teeth, the rack bar being connected to the said reciprocating piston to cause reciprocation of the said piston in response to rotary movements of the king pin, the king pin having a portion extending downwardly through the upper fifth wheel, the downwardly extended portion of the king pin including a locking lug in keyed connection with the lower fifth wheel when the tractor-trailer unit is coupled whereby angulation of the tractor-trailer unit causes rotary movements of the king pin relative to the said bearing collar, and bypass means hydraulically connected to the damping device adapted to provide metered displacement of hydraulic fluid under predetermined flow resistance in response to the reciprocation of the piston, the reciprocating piston of the damping device thereby being operable to resist rotary movements of the king pin which are produced by rapid angulation of the tractor-trailer unit to suppress jack-knifing but being yieldable without substantial resistance to the rotary movements of the king pin produced by the normal steering angulation of the tractor with respect to the trailer.

2. In a tractor-trailer unit including upper and lower fifth wheels and having a king pin passing through the said fifth wheels to establish a draft connection therebetween, a hydraulic damping apparatus applied to prevent jack-knifing of the tractor-trailer unit comprising; bearing means on the upper fifth wheel for rotatably mounting the king pin, the lower fifth wheel having a converging guideway adapted to receive and guide the lower end of said king pin automatically to coupling position, the said converging guideway terminating in a slot arranged to confine the king pin in coupled position, the lower end of the king pin having a locking lug adapted to key with the said slot whereby angulation of the tractor-trailer unit causes responsive rotary movements of the king pin relative to said bearing means, pinion teeth formed on the upper portion of the king pin, a rack bar having teeth engaged with the said king pin teeth, a hydraulic cylinder mounted upon the upper fifth wheel adjacent said bearing and having a piston slideably mounted therein, the said piston being connected to the rack bar whereby angulations of the tractor-trailer are converted into lineal piston movements by said rack bar connection, and bypass means associated with the cylinder adapted to provide metered flow of hydraulic fluid under predetermined flow resistance in response to the lineal piston movements, the piston thereby being arranged to resist rapid rotary movements of the king pin and thereby to prevent sudden angulations of the tractor-trailer unit, but being adapted to be moved without substantial resistance during rotary movements produced by normal steering angulations of the tractor with respect to the trailer.

3. In a tractor-trailer unit including upper and lower fifth wheels and a king pin adapted to establish a draft connection between the tractor and trailer, a damping apparatus adapted to prevent jack-knifing comprising; a hydraulic cylinder mounted upon one of said fifth wheels having a piston slidably mounted therein, a piston rod extending outwardly from the said cylinder, a rack bar connected to the extended end of said piston rod, gear teeth formed on said king pin meshing with the said rack bar, means for rotatably mounting the king pin on one of said fifth wheels whereby rotation of the king pin is effective to reciprocate the rack bar and piston with respect to the cylinder, means for non-rotatably locking the king pin to the other of said fifth wheels whereby relative angular movement between the tractor and trailer is resisted by the said hydraulic cylinder, an external by-pass line connecting the respective opposite ends of the hydraulic cylinder for passage of the hydraulic fluid displaced upon movements of the piston, and an adjustable metering valve in the said external by-pass line operable to control the flow resistance in said line and thereby to regulate the resistance to angular movements between the tractor and trailer.

4. In a tractor-trailer unit including upper and lower fifth wheels and a king pin adapted to establish a draft connection between the tractor and trailer, a damping apparatus adapted to prevent jack-knifing comprising; a hydraulic cylinder mounted upon the upper fifth wheel having a piston slidably mounted therein, a piston rod extending outwardly from the said cylinder, a rack bar connected to the extended end of said piston rod, pinion teeth formed on said king pin meshing with the said rack bar, a bearing collar secured to the upper fifth wheel for rotatably mounting the king pin, means for non-rotatably keying the king pin to the lower fifth wheel whereby relative angular movements between the tractor and trailer causes rotary movements of the king pin relative to the said bearing collar, the bearing collar having a lateral flange slidably supporting the rack bar with respect to the pinion teeth, rollers mounted on said flange engaging the rack bar to control the meshing engagement of the rack bar with respect to the pinion teeth, the bearing collar having an opening adjacent the flange to expose the rack bar teeth to the pinion teeth and thereby to reciprocate the rack bar and piston in response to rotary movements of the king pin, the hydraulic cylinder having bypass means adapted to provide metered flow of hydraulic fluid under predetermined flow resistance in response to the reciprocation of the piston, the bypass means being operable to resist rapid piston movements and thereby to prevent jackknifing of the tractor-trailer unit.

5. In a tractor-trailer unit including upper and lower fifth wheels and having a king pin passing through the said fifth wheels to establish a draft connection therebetween, a hydraulic damping apparatus adapted to prevent jackknifing of the tractor-trailer unit, said hydraulic damping apparatus comprising, bearing means on the upper fifth wheel rotatably mounting the king pin, the lower fifth wheel having a converging guideway adapted to receive and guide the lower portion of said king pin into coupling position therewith, the said converging guideway terminating in a slot, the lower end of the king pin having a locking element thereon providing a keyed engagement with the slot whereby angulation of the tractor-trailer unit causes responsive rotary movement of the king pin relative to said bearing means, driving means disposed radially on the upper portion of the king pin, a hydraulic cylinder mounted in fixed position upon the upper fifth wheel adjacent said bearing means and having a piston slidably mounted therein, a lineally movable piston rod connected to said piston and extending to the king pin, cooperating means on the piston rod directly engaging said driving means and converting the rotary movements of the king pin into lineal piston motion, and bypass means connected with the opposite ends of the cylinder providing a metered flow of hydraulic fluid under predetermined flow resistance in response to the lineal piston movements, the piston thereby being effective to resist rapid rotary movements of the king pin and sudden angulation of the tractor-trailer unit but providing normal steering angulation without substantial resistance.

6. In a tractor-trailer unit including upper and lower fifth wheels having a king pin passing through the said fifth wheels to establish a draft connection therebetween, a hydraulic damping apparatus adapted to prevent jackknifing of the tractor-trailer unit, said hydraulic damping apparatus comprising, bearing means on one of said fifth wheels rotatably mounting the king pin, the second fifth wheel having a converging guideway adapted to receive and guide the king pin into coupling position therewith, the said converging guideway terminating in a slot, the king pin having a locking element providing a keyed engagement wtih the slot, whereby angulation of the tractor-trailer unit causes rotary movement of the king pin relative to said bearing means, a hydraulic cylinder mounted in fixed position upon the fifth wheel adjacent said bearing means and having a piston slidably mounted therein, a lineally movable piston rod connected to said piston and extending to the king pin, driving means disposed radially upon the king pin, cooperating means on the piston rod directly engaging said driving means and converting the rotary movements of the king pin into lineal piston motion, and bypass means connected with the opposite ends of the cylinder providing a metered flow of hydraulic fluid under predetermined flow resistance in response to the lineal piston movements, the piston thereby being effective to resist rapid rotary movements of the king pin and sudden angulation of the tractor-trailer unit but providing normal steering angulation without substantial resistance.

References Cited in the file of this patent

UNITED STATES PATENTS

| Number | Name | Date |
|---|---|---|
| 903,884 | Przygode | Nov. 17, 1908 |
| 1,654,093 | Reid | Dec. 27, 1927 |
| 2,170,893 | Humphrey | Aug. 29, 1939 |
| 2,213,221 | Johnson | Sept. 3, 1940 |
| 2,461,212 | Hanna | Feb. 8, 1949 |
| 2,470,383 | Wakeman | May 17, 1949 |